UNITED STATES PATENT OFFICE.

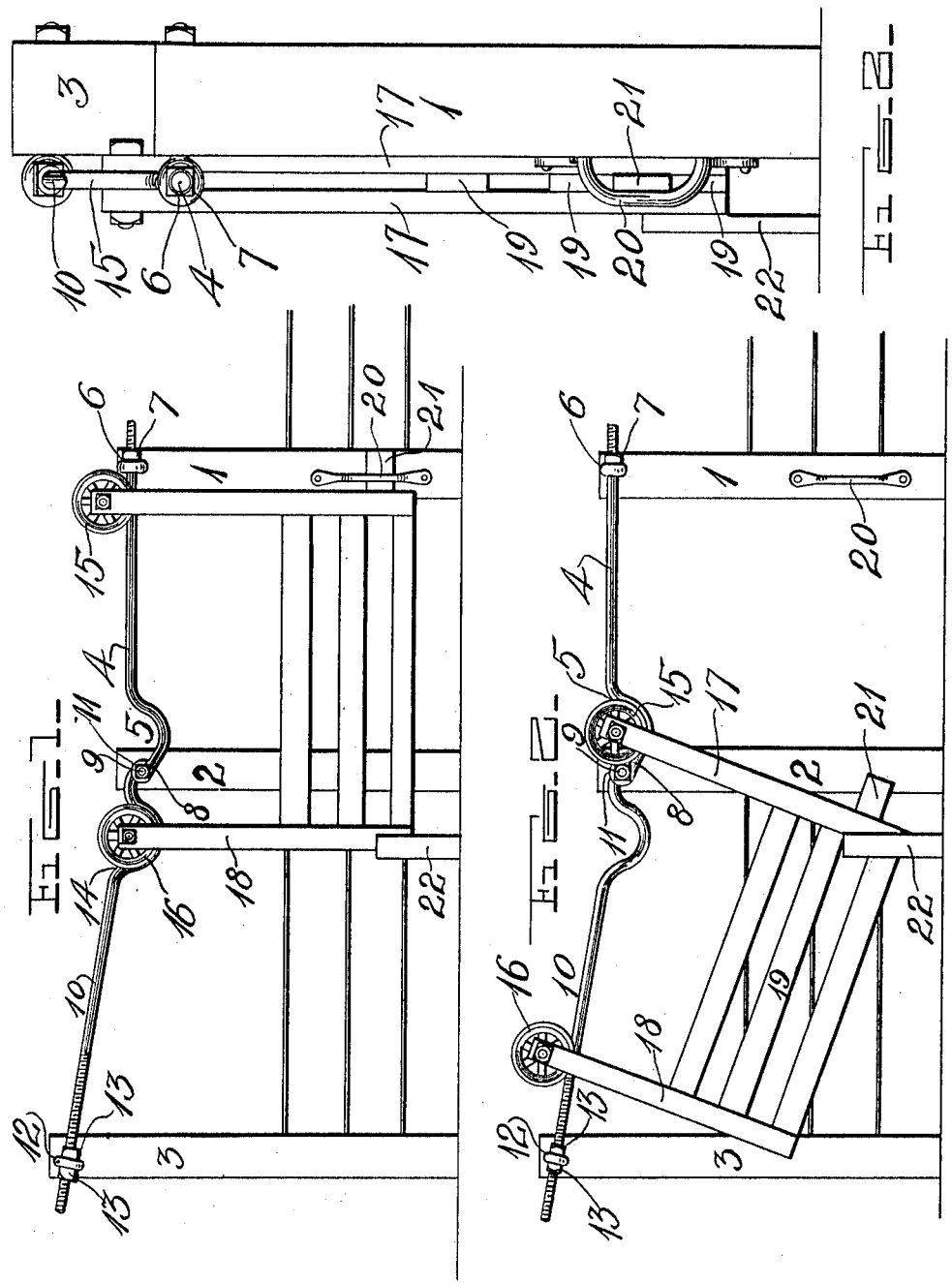

PAUL OTTO, OF MARLIN, TEXAS, ASSIGNOR OF ONE-FOURTH TO WILEY DAVIS, OF MARLIN, TEXAS.

GATE.

984,389.  Specification of Letters Patent.  Patented Feb. 14, 1911.

Application filed October 20, 1910. Serial No. 588,132.

*To all whom it may concern:*

Be it known that I, PAUL OTTO, a citizen of the United States, residing at Marlin, in the county of Falls and State of Texas, have invented certain new and useful Improvements in Gates; and I do declare the following to be a full, clear, and exact description of the invention, such as will enable others skilled in the art to which it appertains to make and use the same.

This invention relates to improvements in sliding gates.

One object of the invention is to provide a gate of this character having an improved construction and arrangement of supporting mechanism adapted to support the gate in position to permit the same to be readily opened when lifted to a released position and whereby the gate will close itself when released from the mechanism which holds it open.

Another object is to provide a gate which will not remain in a partly opened position and which when entirely opened or closed will automatically fasten itself in these positions.

With the foregoing and other objects in view, the invention consists of certain novel features of construction, combination and arrangement of parts as will be more fully described and particularly pointed out in the appended claims.

In the accompanying drawings: Figure 1 is a front view of a gate constructed in accordance with my invention showing the same in a closed position; Fig. 2 is a similar view showing the gate in an open position; Fig. 3 is an end view of the gate engaged with the latch post.

Referring more particularly to the drawings, 1, 2 and 3 denote the gate supporting posts, the post 1 also serving as the latch post with which the gate is engaged when in a closed position. The posts 1 and 2 are connected together at their upper ends by a gate supporting rod 4, in the inner end of which is formed a downwardly projecting loop or depression 5 the purpose of which will be hereinafter described. The outer end of the rod is engaged with an eye bolt or bracket 6 arranged in the post 1. The end of the rod which projects through the bracket is threaded and has screwed thereon a nut 7. In the inner end of the rod is formed an eye 8 which is adapted to be engaged with a bolt 9 in the post 2 as shown.

The posts 2 and 3 are connected together at their upper ends by a gate supporting rod 10. The inner end of the rod 10 has formed therein an eye 11 which is also engaged with the bolt 9 in the post 2. The outer end of the rod 10 is threaded and engages an eye bolt or bracket 12 arranged in the upper end of the post 3 and on said threaded end of the rod are screwed fastening nuts 13 which are adapted to be screwed up into engagement with the opposite sides of the bracket 12.

The post 3 is of greater height than the posts 1 and 2 and the outer end of the rod 10 is thus supported above or higher than the inner end whereby said rod is held at an angle, as shown. In the inner end of the rod 10 is formed a loop or depression 14 said loop being disposed in juxtaposition to the loop 5 in the rod 4 as shown.

Engaged with and adapted to travel on the rod 4 is a grooved gate supporting wheel 15, while engaged with and adapted to travel on the rod 10 is a grooved guide wheel 16. To the axle or journal of the wheel 15 are connected the upper ends of a pair of parallel front end gate supporting bars 17 while to the axle or journal of the wheel 16 are connected the upper ends of a pair of parallel rear end gate supporting bars 18. The pairs of front and rear end supporting bars 17 and 18 are connected by a series of parallel horizontally disposed cross bars 19 or any other construction or arrangement of bars, rods, wires or other material adapted to form a gate.

Arranged on the latch post 1 adjacent to the lower end thereof is a keeper 20 in the form of a bail having its opposite ends engaged with and secured to the post as shown. On the front end of the gate is arranged a latch bar or fastening lug 21 which when the gate slides to a closed position is adapted to automatically engage the keeper 20 and thereby prevent the lateral swinging or opening of this end of the gate. The opposite or rear end of the gate is held against lateral opening movement by a short post or stake 22 set in the ground near the post 2 and in position to be engaged by the rear end of the gate when the latter is in closed position. The supporting rods 4 and 10 which connect the upper ends of the posts serve as braces for the posts and obviate the necessity of any further braces.

In the operation of the gate, to open the same, the rear end of the gate is first lifted to disengage the wheel 16 from the loop 14 after which the gate may be readily pushed back until the wheel 15 comes into engagement with the loop 5 whereupon the gate will be held in a full open position. In thus opening the gate the wheel 16 will ride up the inclined rod 10. When it is desired to shut the gate the front end of the same is lifted until the wheel 15 is disengaged from the loop 5 whereupon the gate will immediately slide or roll back to a closed position in which the wheel 16 again engages the loop 14, thus together with the engagement of the lugs 21, with the keeper 20 fastening the gate in closed position. If at any time it is desired to drive through the gate with a load which is higher than the bar 4 the latter may be readily removed by disengaging the end of the same from the bolt 9 and removing the opposite end from the bracket 6.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. In a gate of the character described, a series of supporting posts, gate supporting rods secured to and connecting the upper ends of said posts, gate fastening loops formed in said rods adjacent and at opposite sides of the central post, gate supporting wheels adapted to travel on said rods when the gate is moved to open and closed positions, said wheels being adapted to engage the loops in the rods whereby the gate is held in open or in closed position, and a gate secured to and supported by said wheels.

2. In a gate, the combination of a latch post, an intermediate post and an outer supporting post, supporting rods secured to and connecting the upper ends of said posts, the rod extending between the central post and the inner post being inclined, and both of said rods being provided with depending loops adjacent and at opposite sides of the central post, gate supporting wheels mounted on said rods and adapted to alternately engage the said loops whereby the said gate will be held automatically in either its closed or open position, a bail arranged on the side of the latch post, a lug on the end of the gate adapted to project through said bail, and a stake arranged adjacent the fence and between the central post and the innermost post to hold the gate against lateral movement in either of its positions.

3. In a gate, the combination of a plurality of supporting posts, connecting rods extending between said posts and having their inner ends attached to the central post and provided with depending loops adjacent the opposite sides of said post, brackets on the upper ends of the outer posts through which the outer ends of said rods project, securing nuts mounted on the ends of the rods and adapted to secure the same in said brackets, a gate having hangers at its ends, and wheels journaled in the upper ends of said hangers to ride upon the connecting rods, and adapted each to engage the recess in its respective connecting rod when the other wheel is out of engagement with the recess in its connecting rod.

In testimony whereof I have hereunto set my hand in presence of two subscribing witnesses.

PAUL OTTO.

Witnesses:
　BENJAMIN L. L. TAYLOR,
　GEORGE B. CALLIN.